United States Patent
Wraback et al.

(10) Patent No.: US 6,366,389 B1
(45) Date of Patent: Apr. 2, 2002

(54) HIGH CONTRAST, ULTRAFAST OPTICALLY-ADDRESSED ULTRAVIOLET LIGHT MODULATOR BASED UPON OPTICAL ANISOTROPY

(76) Inventors: Michael Wraback, 21219 Virginia Pine Ter., Germantown, MD (US) 20876; Paul H. Shen, 13809 Mustang Hill La., N. Potomac, MD (US) 20878; Shaohua Liang, 9 Renfro Rd., Somerset, NJ (US) 08873; Chandrasekhar R. Gorla, 2243 Mclaughlin Ave., Apt #1, San Jose, CA (US) 95122; Yicheng Lu, 50 Jernee Dr., East Brunswick, NJ (US) 08816

( * ) Notice: Subject to any disclaimer, the term of this patent is extended or adjusted under 35 U.S.C. 154(b) by 0 days.

(21) Appl. No.: 09/638,156

(22) Filed: Aug. 15, 2000

Related U.S. Application Data

(60) Provisional application No. 60/149,264, filed on Aug. 17, 1999.

(51) Int. Cl.[7] .................................................. G02F 1/07
(52) U.S. Cl. ........................................ 359/244; 359/248
(58) Field of Search .................................. 359/244, 248, 359/264, 241; 257/43

(56) References Cited

U.S. PATENT DOCUMENTS 5,875,052 A * 2/1999 Shmagin et al. ............ 359/244

* cited by examiner

*Primary Examiner*—Georgia Epps
*Assistant Examiner*—Tuyen Tra

(57) ABSTRACT

A high contrast ultrahigh speed optically-addressed ultraviolet light modulator exploits the optical anisotropy in a ZnO film epitaxially grown on (01 12) sapphire. This device, which could also be realized in a ZnO bulk crystal or similar wide bandgap material, achieves both high contrast and high speed by exploiting the anisotropic bleaching of the anisotropic absorption and concomitant ultrafast polarization rotation near the lowest exciton resonances produced by femtosecond ultraviolet pulses. The resultant modulation in a preferred embodiment is characterized by a contrast ratio of 70:1, corresponding to a dynamic polarization rotation of 12°, and decays to a quasi-equilibrium value within 100 ps.

12 Claims, 8 Drawing Sheets

HIGH CONTRAST, ULTRAFAST OPTICALLY-ADDRESSED ULTRAVIOLET LIGHT MODULATOR BASED UPON OPTICAL ANISOTROPY

CLAIM TO PRIORITY

Applicants claim domestic priority under 35 U.S.C. § 119 (e) based on provisional application Ser. No. 60/149,264 having a filing date of Aug. 17, 1999.

TECHNICAL FIELD

This invention relates generally to optical modulators and more particularly to ZnO optical modulators capable of operation in the ultraviolet range.

BACKGROUND

Electrical and optical control of optical anisotropy in semiconductor heterostructures have become effective methods of producing both high contrast and high speed modulation of normal incident light. See H. Shen, J. Pamulapati, M. Wraback, M. Taysing-Lara, M. Dutta, H. C. Kuo, and Y. Lu, IEEE Phot. Tech. Lett. 6, 700 (1994); H. Shen, M. Wraback, J. Pamulapati, M. Dutta, P. G. Newman, A. Ballato, and Y. Lu, Appl. Phys. Lett. 62, 2908 (1993); M. J. Snelling, D. R. Harken, A. L. Smirl, and E. Towe, IEEE J. Quant. Elect. 33, 1114 (1997); D. S. McCallum, X. R. Huang, A. L. Smirl, D. Sun, and E. Towe, Appl. Phys. Lett. 66, 2885 (1995), incorporated herein by reference as if fully set forth. These techniques rely upon the manipulation of the polarization rotation and phase retardation of linearly polarized light associated with a processing- or growth-induced lowering of symmetry. See H. Shen, M. Wraback, J. Pamulapati, P. G. Newman, M. Dutta, Y. Lu, and H. C. Kuo, Phys. Rev. B47, 13933 (1993); R. Binder, Phys. Rev. Lett. 78, 4466 (1997); R. H. Henderson and E. Towe, J. Appl. Phys. 79, 2029 (1995), incorporated herein by reference as if fully set forth. An infrared optical modulator has been demonstrated which exploits the optical anisotropy created by an internal thermally induced, in-plane anisotropic strain in a GaAs/AlGaAs multiple quantum well (MQW) to achieve a contrast ratio of 5000:1 for electrical addressing and 300:1 for optical addressing. Time-resolved measurements (see M. Wraback, H. Shen, J. Pamulapati, M. Dutta, P. G. Newman, M. Taysing-Lara, and Y. Lu, Surf Sci. 305, 238 (1994); M. Wraback, H. Shen, J. Pamulapati, P. G. Newman, and M. Dutta, Phys. Rev. Lett. 74, 1466 (1995), incorporated herein by reference as if fully set forth) indicate that the device possesses a sub-100 fs turn-on time driven by ultrafast large-angle polarization rotation, and a turn-off time governed primarily by carrier sweepout. Electrically and optically addressed InGaAs/GaAs MQW modulators with ~25:1 contrast which employ an optical anisotropy associated with growth on a (110) GaAs substrate have also been realized. Nevertheless, despite the success of these techniques in the fabrication of high contrast high speed infrared modulators, high contrast, ultra-fast modulators operating in the visible and ultraviolet range have not yet been realized. Of course, a vastly greater amount of information could be conveyed by a high contrast optical modulator capable of operating in the ultraviolet range.

SUMMARY OF THE INVENTION

Accordingly, it is an object of the present invention to provide a high contrast, ultrahigh speed optical modulator capable of operating in the ultraviolet range. Still other objects of the present invention will become readily apparent to those skilled in this art from the following description herein, where there is shown and described a preferred embodiment of this invention, simply by way of illustration one of the modes to best carry out the invention. Pursuant to the invention the limitations of the existing art are overcome and additional advantages provided by a high contrast, ultrafast optically-addressed ultraviolet light modulator based upon optical anisotropy. The invention in one embodiment encompasses a high contrast, high speed ultraviolet light modulator including a light source, a semiconductor having a bandgap in the ultraviolet range grown on a substrate surface of low rotation symmetry whereby the semiconductor exhibits optical anisotropy, a pulse generator for delivering a pulsed modulating beam for the optical control of the optical anisotropy whereby the light source is modulated. In another embodiment of the invention, the lower rotation symmetry surface is R-plane sapphire. In another embodiment of the invention the semiconductor comprises a single crystal ZnO film epitaxially grown on an R-plane sapphire substrate.

Yet another embodiment of the invention is a high contrast, high speed ultraviolet light modulator including a light source, a bulk crystal having a bandgap in the ultraviolet range cut such that the surface of the crystal is a surface of low rotation symmetry whereby the crystal exhibits optical anisotropy, and a pulse generator for delivering a pulsed modulating beam for the optical control of an optical anisotropy in the bulk crystal whereby the light source is modulated. In another embodiment of the invention the bulk crystal is ZnO. As will be realized, the invention is capable of other different embodiments and its several details are capable of modification in various, obvious aspects all without departing from the invention. Accordingly, the drawings and descriptions will be regarded as illustrative in nature and not restrictive.

BRIEF DESCRIPTION OF THE DRAWINGS

A better understanding of the invention will be obtained when the following detailed description of the invention is considered in connection with the accompanying drawings.

FIG. 2 shows the relationship between the lowering of crystal rotation symmetry and optical anisotropy.

DETAILED DESCRIPTION

In order to realize a high contrast optical modulator capable of operation in the ultraviolet range, a wide bandgap optically anisotropic semiconductor material is needed. Zinc oxide (ZnO) is a wide bandgap (~3.3 eV) semiconductor which has received increasing attention due to the important role it may play in the emerging technology of blue and ultraviolet lasers and modulators. It exhibits stimulated emission as well as optically pumped lasing action (see D. C. Reynolds, D. C. Look, and B. Jogai, *Sol. State Comm.* 99, 873 (1996); D. M. Bagnall, Y. F. Chen, Z. Zhu, T. Yao, S. Koyama, M. Y. Shen, and T. Goto, *Appl. Phys. Lett.* 70, 2230 (1997); Z. K. Tang, G. K. L. Wong, P. Yu, M. Kawasaki, A. Ohtomo, H. Koinuma, and Y. Segawa, *Appl. Phys. Lett.* 72, 3270 (1998), incorporated herein by reference as if fully set forth herein) and has been used as a buffer layer for the growth of high quality gallium nitride thin films (see F. Hamdani, M. Yeadon, D. J. Smith, H. Tang, W. Kim, A. Salvador, A. E. Botchkarev, J. M. Gibson, A. Y. Polyakov, M. Skowronski, and H. Morkoc, *J. Appl. Phys.* 83, 983 (1998), incorporated herein by reference as if fully set forth herein). Although it is normally deposited on (0001) sapphire, growth of ZnO thin films on R-plane (0112) sapphire substrates for acousto-optic (see M.-S. Wu, A. Azuma, T. Shiosaki, and A. Kawabata, *J. Appl. Phys.* 62, 2482 (1987)), photochromic (see K. Kobayashi, T. Matsubara, S. Matsushima, S. Shirakata, S. Isomura, and G. Okada, *J. Mat. Sci. Lett.* 15, 457 (1996)), and piezoelectric (see N. W. Emanetoglu, S. Liang, C. R. Gorla, Y. Lu, S. Jen, and R. Subramanian, *IEEE Ultrasonics Symp. Proc.* 1997, 195 (1997)) device applications has been demonstrated. However none of these applications employs optical anisotropy. Optical data from bulk ZnO indicate that such films, if single crystal, would possess a strong optical anisotropy at near bandgap photon energies around the lowest exciton resonances primarily due to the different selection rules for light polarized parallel and perpendicular to the in-plane c-axis (see W. Y. Liang and A. D. Joffe, *Phys. Rev. Lett.* 20, 59 (1968)). The present invention successfully exploits these properties to make a high contrast, high speed ultraviolet light modulator.

Figure 1:
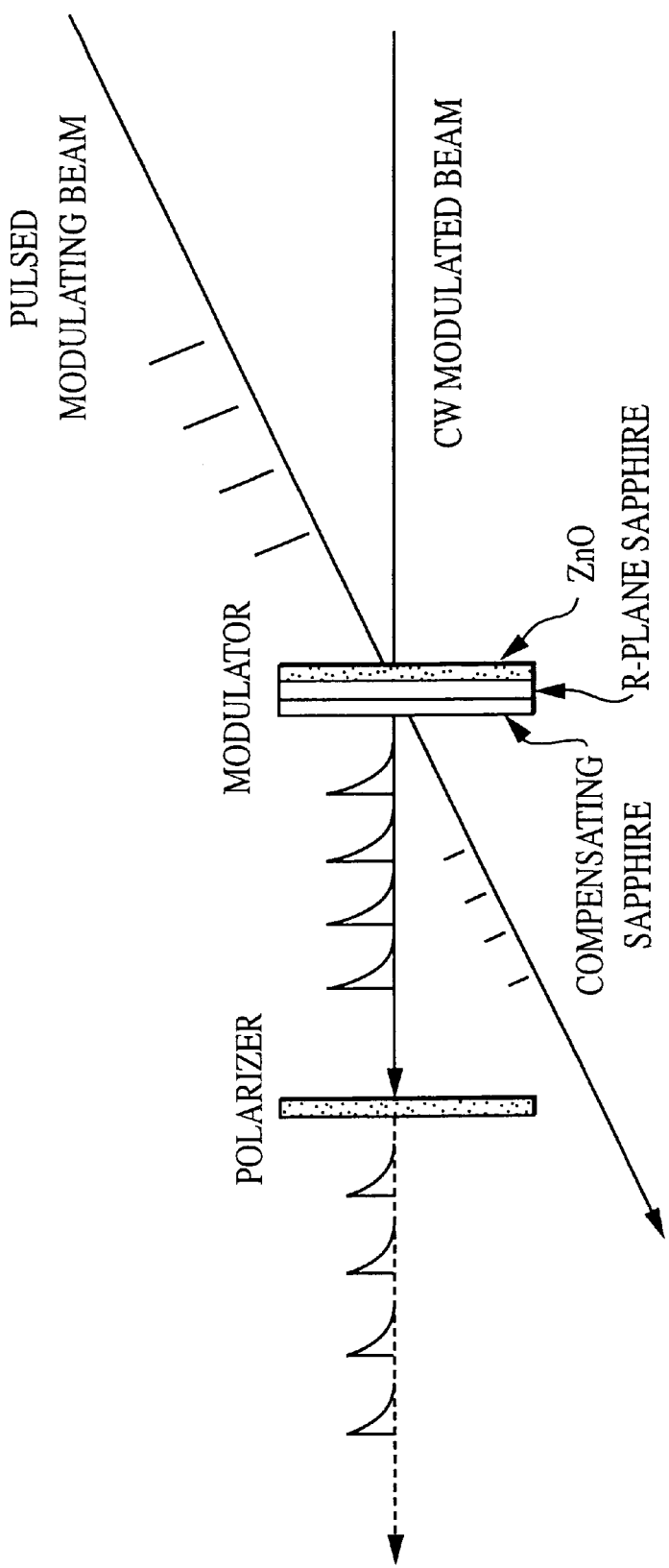
FIG. 1 shows a schematic drawing of a preferred embodiment of the invention of this application.

In a preferred embodiment as shown in FIG. 1, the ultraviolet light modulator of the present invention employs ultrashort pulses for the optical control of the optical anisotropy in high quality single crystal ZnO films epitaxially grown on R-plane sapphire substrates. A contrast ratio of 70:1, corresponding to an ultrafast polarization rotation of 12 degrees, and a full width at half maximum (FWHM) of less than 3 ps have been observed.

While bulk crystal ZnO could also be used if the crystal is cut such that the surface plane is one of low rotation symmetry, it is far more cost effective at present to use a thin film of ZnO on a sapphire substrate. High quality, single crystal ZnO films were grown by metal-organic chemical vapor deposition (MOCVD) on the (0112) surface of sapphire substrates. The epitaxial relations are (1120) ZnO parallel to (0112) sapphire, and [0001] ZnO parallel to [0$\bar{1}$11] sapphire, thus indicating that the c-axis of the ZnO is in the growth plane. These relations were determined by X-ray diffraction (θ–2θ, and φ-scan) and high resolution cross-sectional transmission electron microscopy (HR-TEM) with selective electron diffraction (see S. Liang, C. R. Gorla, N. Emanetoglu, and Y. Lu, *J. Electron. Mat.* 27, L72 (1998)). The thickness of the film used in our study is ~1 μm.

Figure 2B:
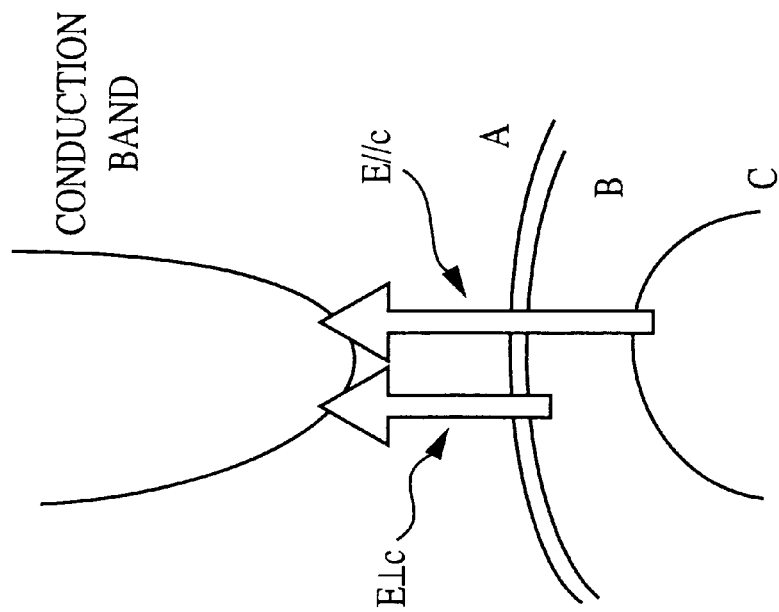
FIG. 2b shows the strength of optical transitions as a function of photon energy for different light polarizations.
Figure 2A:
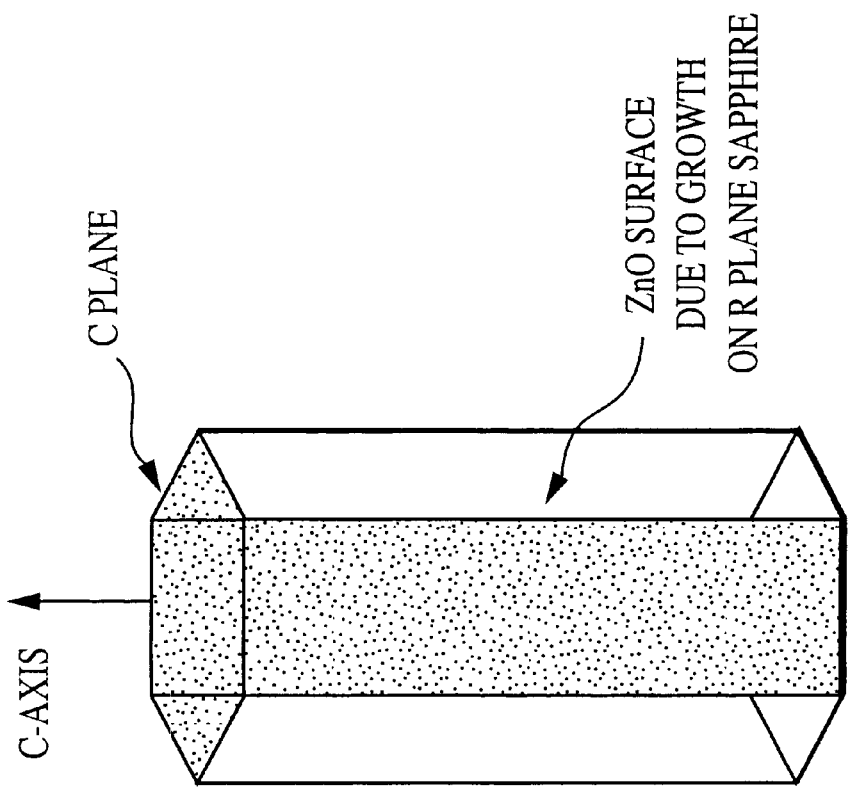
FIG. 2a highlights various surfaces of a hexagonal crystal.

Referring to FIG. 2, the fact that the c-axis is in the growth plane results in optical anisotropy of the ZnO for light incident normal to the structure due to the growth-induced lowering of symmetry. To see this, imagine the wurzite crystal as a three-dimensional structure with hexagonal end faces (FIG. 2a). The height of the structure is the lattice constant c, and the axis normal to the end face is the c-axis. Most wurzite structures are grown with their c-axis parallel to the growth direction (grown on the c-plane). This means that light incident normal to the c-plane sees a surface that possesses six-fold rotation symmetry, while light incident normal to a surface in which the c-axis is in-plane sees a surface possessing only two-fold rotation symmetry. It is this lowering of symmetry that is exploited in our device. One consequence of this effect is that a strong anisotropy in absorption occurs at photon energies near the ZnO bandgap (FIG. 2b).

Figure 3:
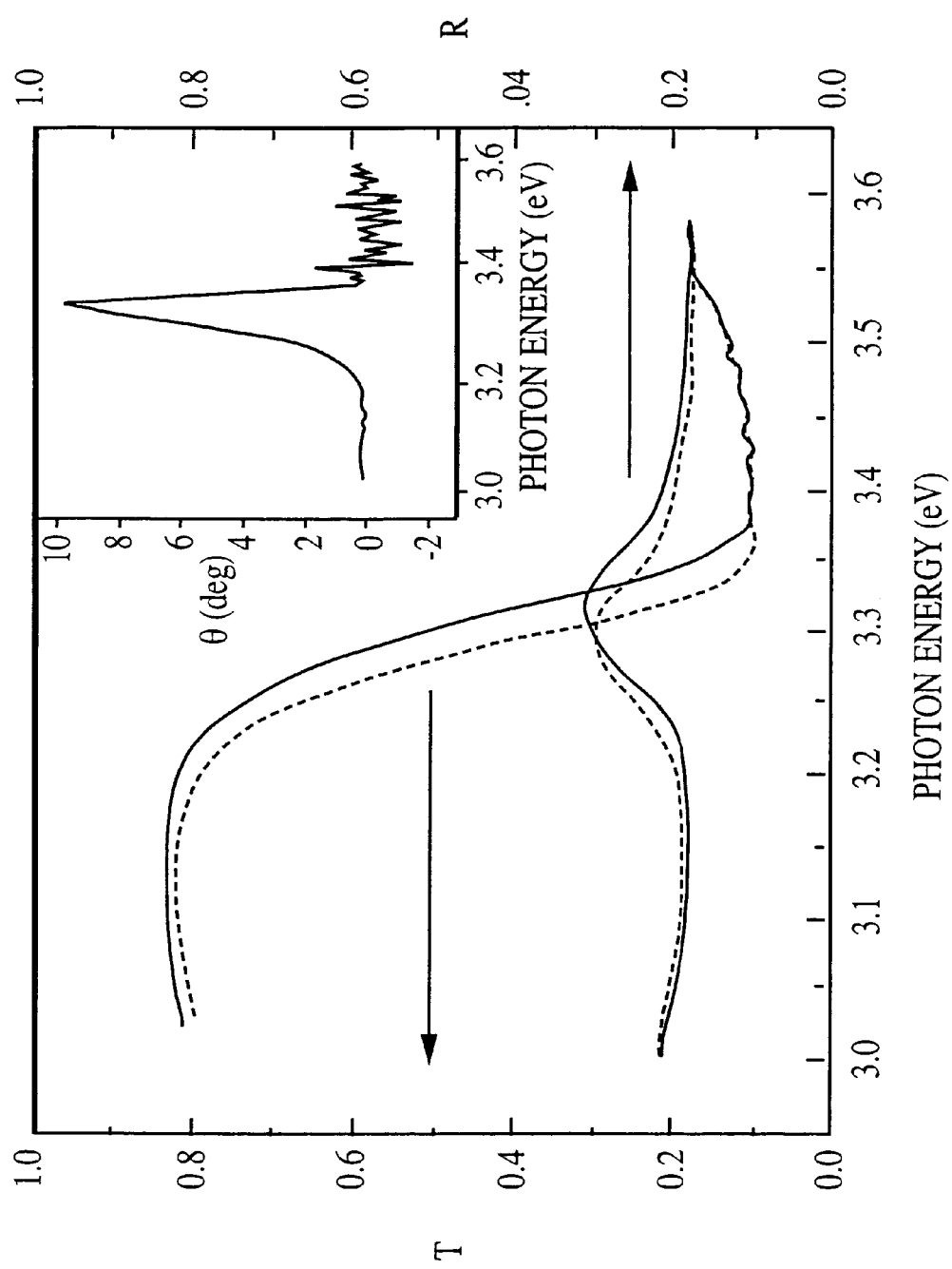
FIG. 3 shows a graph of the transmission and reflectivity of ZnO on R-plane sapphire as a function of photon energy for light polarized parallel (solid lines) and perpendicular (dashed lines) to the c-axis of the ZnO. The inset to the figure depicts the static polarization rotation θ obtained from the transmission data.
Figure 4:
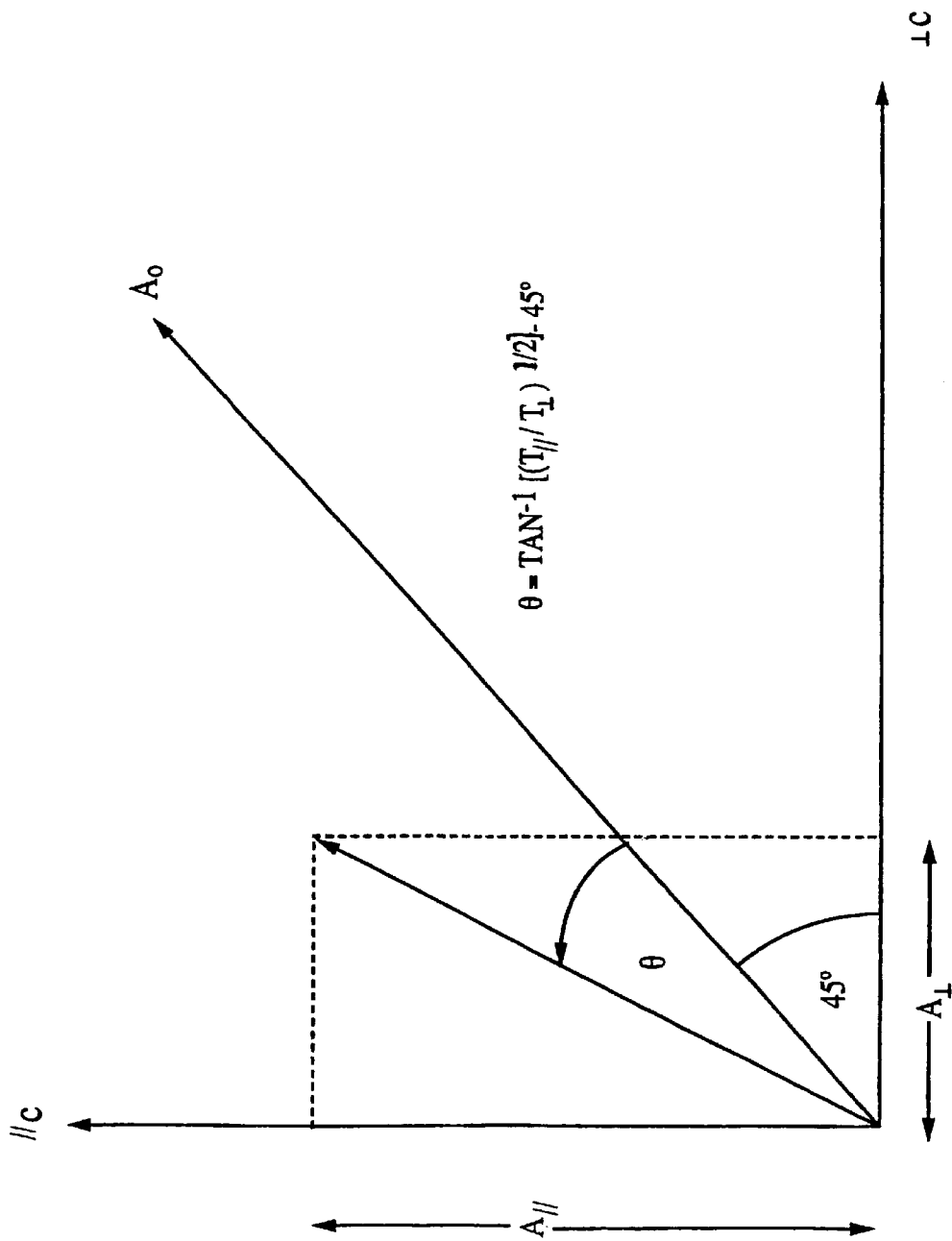
FIG. 4 shows the method of obtaining the static polarization rotation.

FIG. 3 shows the transmission T and reflectivity R of the ZnO film measured as a function of photon energy for light polarized parallel and perpendicular to the c-axis using a xenon arc lamp and monochromator. Although the shape of the transmission and reflectivity curves are similar for the two polarizations, the curves for polarization p||c are shifted by ~20 meV to higher energy with respect to those for p⊥c. As shown in FIG. 2b, this phenomenon is primarily related to the anisotropy in absorption associated with the polarization selection rules combined with the separation in energy of the C band from the A and B bands, the energy separation of which is unresolved at room temperature. In the spectral region around the lowest exciton resonances higher photon energy C-band to conduction band transitions are preferred for light polarized parallel to the c-axis, while lower photon energy transitions from the A and B bands to the conduction band dominate for light polarized perpendicular to the c-axis. For normal incident light linearly polarized at 45° with respect to the c-axis, this leads to a polarization rotation toward the c-axis given by the relation $\theta = \text{Tan}^{-1}[(T_{||}/T_\perp)^{1/2}] - 45°$, where $T_{||}$ and $T_\perp$ are the transmission for p||c and p⊥c, respectively (FIG. 4). The inset of FIG. 3 shows this 'static' polarization rotation as a function of photon energy. A maximum rotation of 10° occurs at 3.335 eV. In the case of a bulk crystal it should be noted that the anisotropy in reflection would be exploited.

Figure 5:
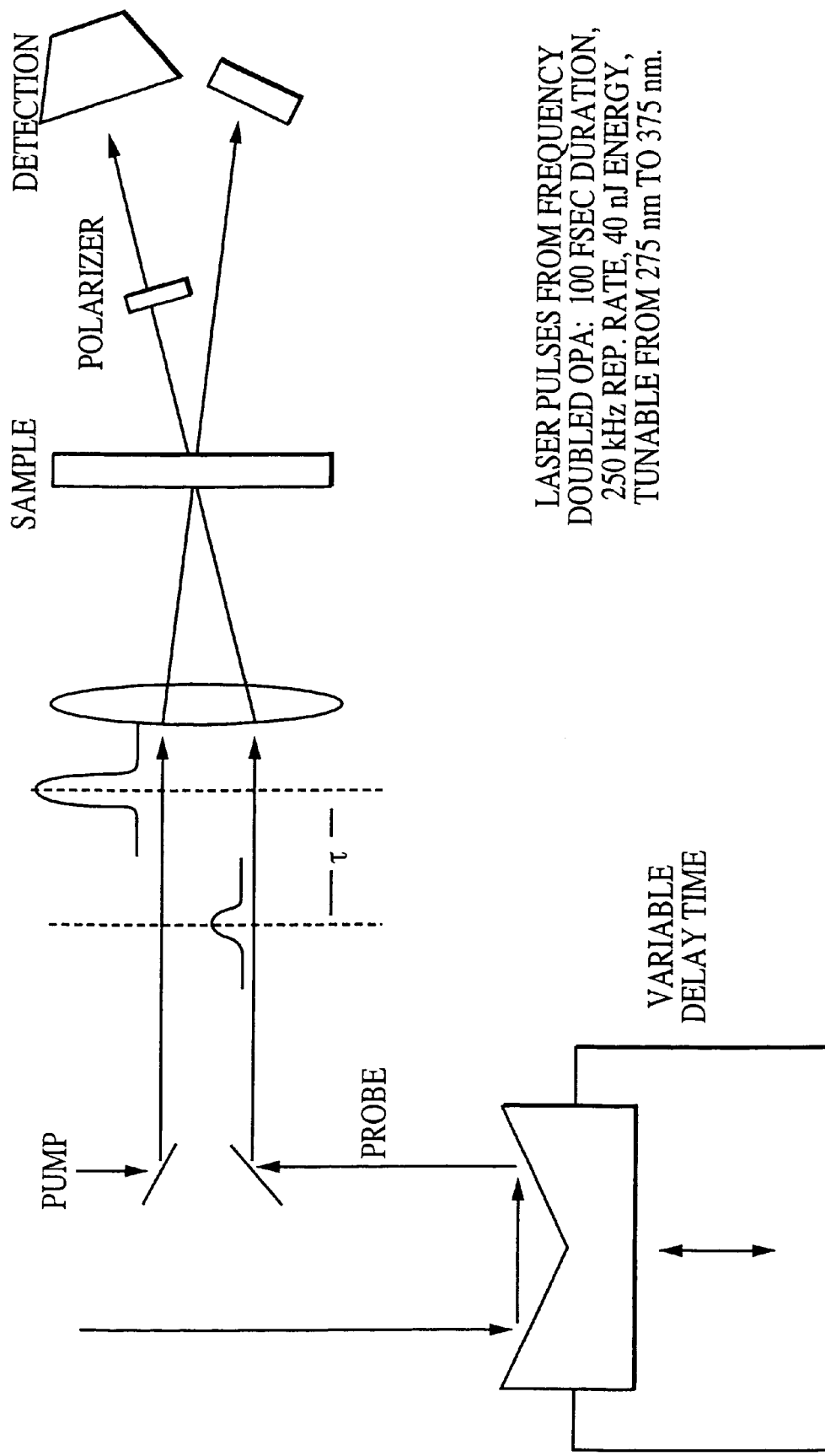
FIG. 5 shows a schematic of a preferred exemplary embodiment of the invention of this application.

Referring to FIG. 5, modulation experiments were performed using visible ultrashort pulses derived from the signal beam of a 250 kHz regenerative amplifier-pumped optical parametric amplifier. These pulses were compressed to less than 60 fs and frequency doubled in a beta barium borate (BBO) crystal to obtain a source of sub-100 fs ultraviolet pulses tunable between 275 nm and 375 nm. Pulses with center wavelength corresponding to the static rotation maximum were used to perform frequency degenerate pump-probe measurements. The polarization of the weak probe pulse was oriented at 45° with respect to the c-axis of the ZnO modulator. The transmission of the probe at the photon energy corresponding to the maximum static rotation was monitored as a function of the time delay between the pump and probe pulses. A phase compensator and polarizer placed after the modulator were oriented for minimum transmission of the probe in the absence of the pump. The polarization of the pump was perpendicular to that of the probe, and the pump intensity was sufficient to generate a carrier density of ~$10^{19}$ cm$^{-3}$.

Figure 6:
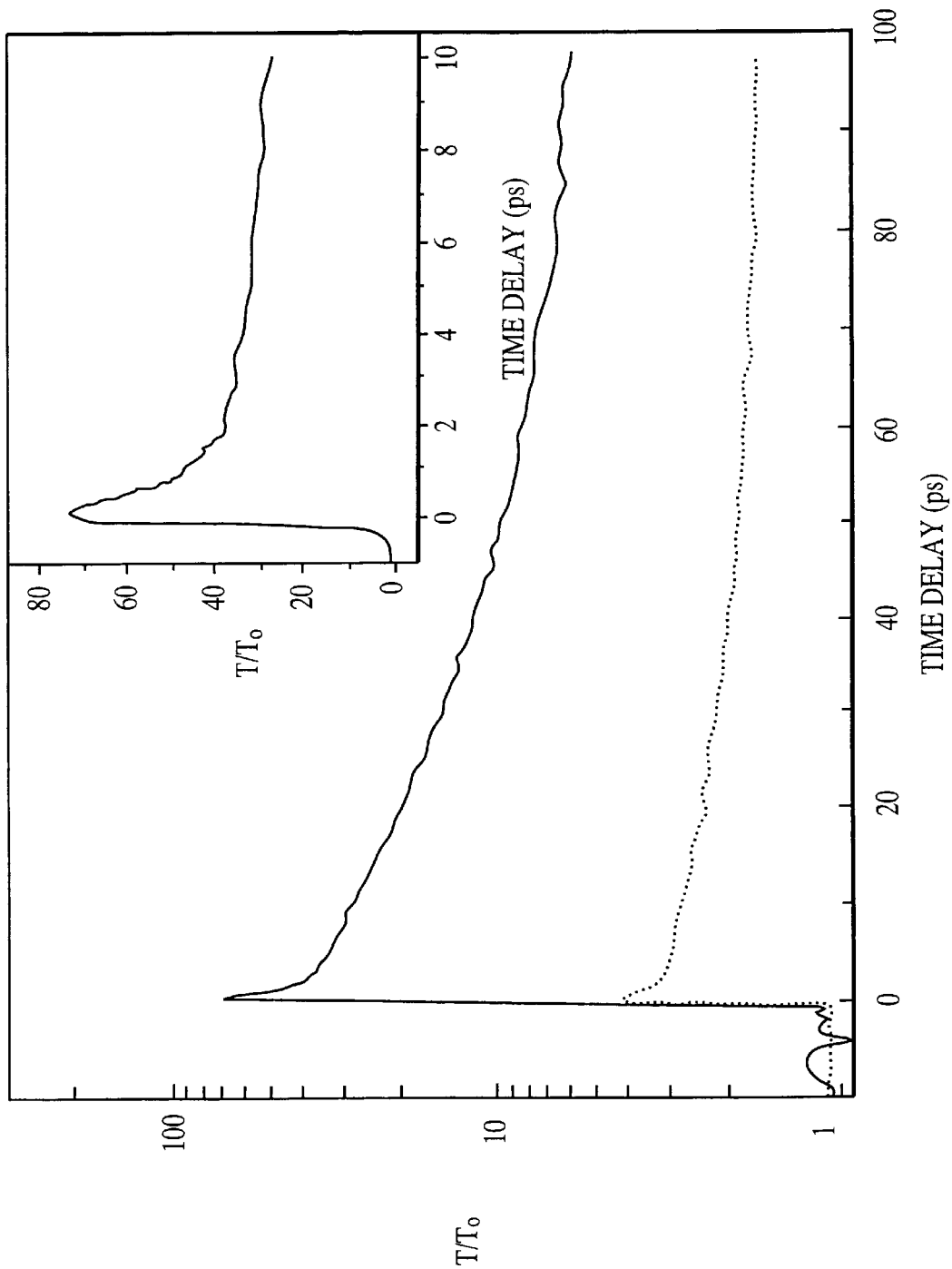
FIG. 6 shows a graph of the normalized probe transmission as a function of time delay between the pump and probe pulses in which the solid line denotes the transmission through a polarizer oriented for minimum transmission in the absence of the pump and the dashed line denotes the unpolarized transmission. The inset to the figure shows the short time scale behavior of the normalized transmission for the crossed polarizer case.

FIG. 6 shows the normalized probe transmission $T/T_o$ through the crossed polarizer as a function of time delay. $T_o$ is the transmission in the absence of the pump. At negative time delays, for which the probe precedes the pump, $T/T_o=1$, as expected. As the pump and probe pulses become temporally coincident in the modulator, a sharp, pulse-width limited rise in probe transmission is observed at time delay $\tau=0^+$ which reaches a maximum more than 70 times greater than its value for negative time delays. This peak value in the normalized transmission is defined as the contrast ratio for the device. The pump-induced transmission possesses an initial decay time of 0.75 ps (inset), followed by a slower decay to a quasi-equilibrium value within 100 ps. Subsequent return to equilibrium occurs on a ns time scale. That time can be reduced to the range of picoseconds by sweeping out the carriers using an applied electric field. The full width at half maximum of the modulation curve is less than 3 ps.

Figure 7:
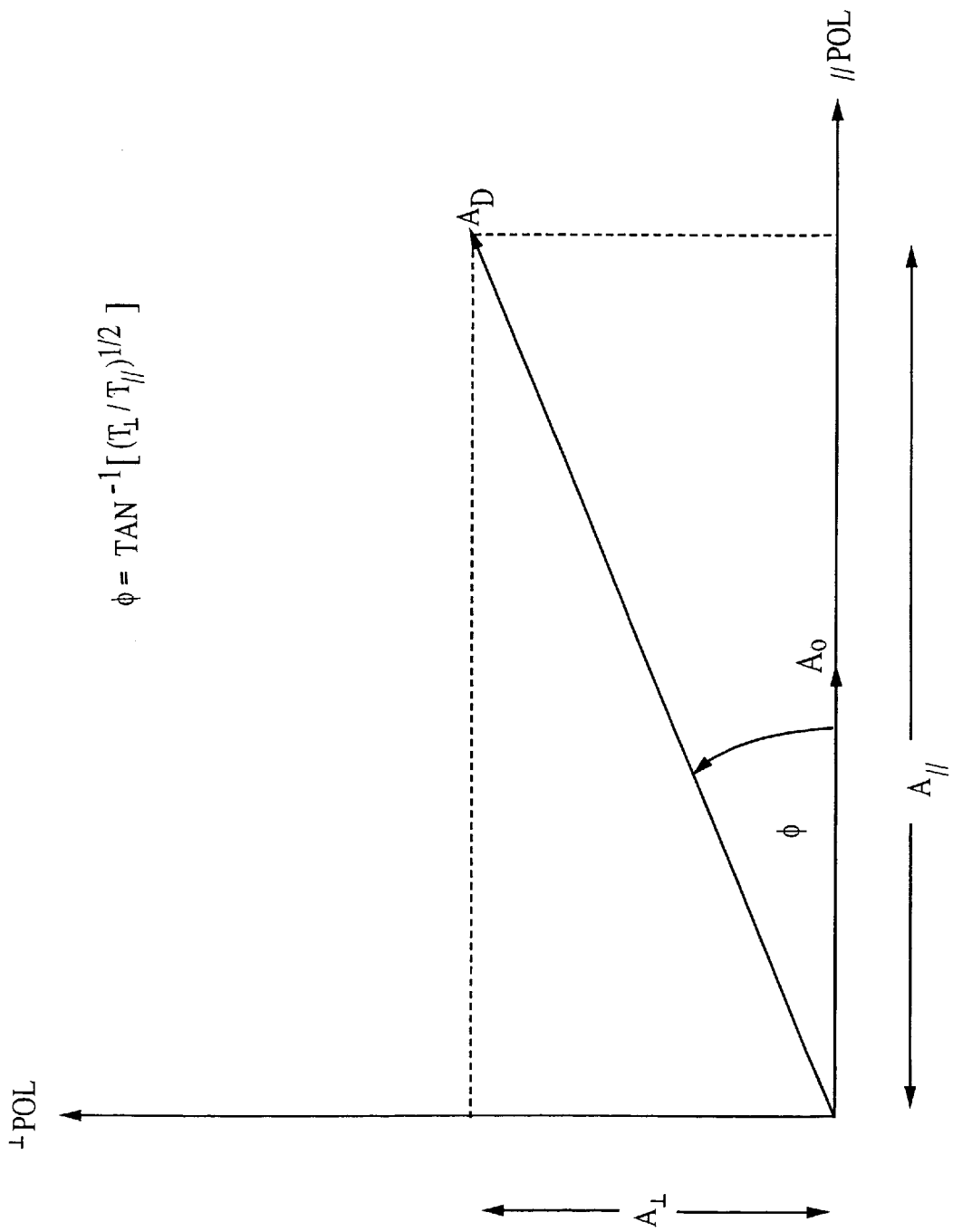
FIG. 7 shows the method of obtaining the dynamic polarization rotation.

The fact that an enhancement in probe transmission occurs through a crossed polarizer indicates that ultrafast dynamic polarization rotation plays an important role in the modulation. Measurements were also performed with the polarizer oriented for maximum transmission in the absence of the pump. The dynamic rotation $\psi$ is then given by the relation $\psi=\tan^{-1}[(T_c/T_u)^{1/2}]$, where $T_c$ and $T_u$ are the probe transmission through a crossed or uncrossed polarizer, respectively (FIG. 7).

Figure 8:
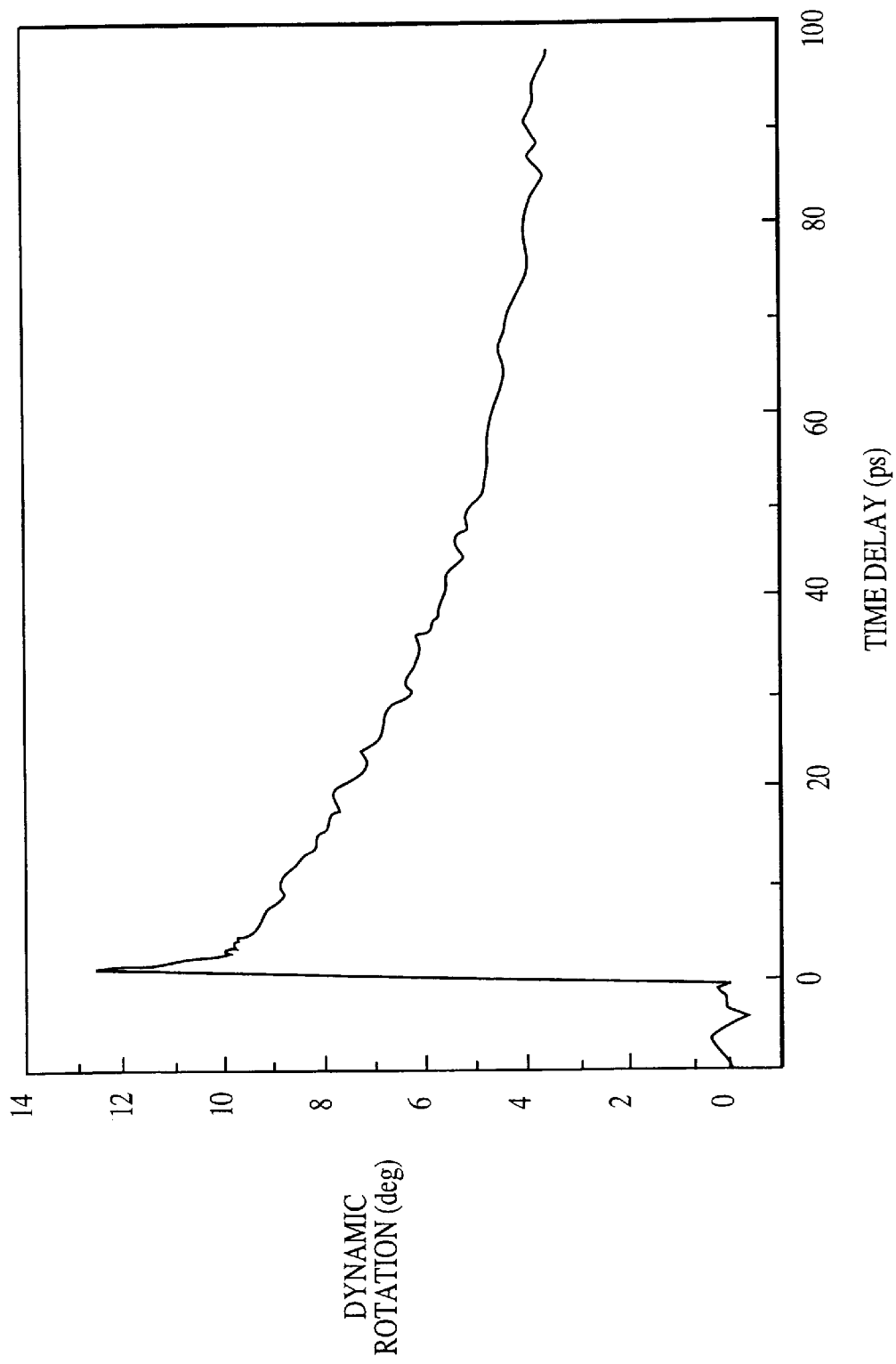
FIG. 8 shows a graph of the dynamic rotation of the probe polarization as a function of time delay between the pump and probe pulses.

FIG. 8 shows the dynamic rotation as a function of time delay. A maximum rotation of more than 12° away from the c-axis, corresponding to the peak in transmission, is observed at $\tau=0^+$. The temporal decay of the dynamic rotation is similar in shape to that of the normalized transmission, reaching a plateau of ~4° within 100 ps.

The use of frequency degenerate pump and probe pulses in our measurements implies that the modulation is driven by the bleaching of the probe absorption due to pump-generated electron-hole pairs which occupy states optically coupled by the probe. This modulation mechanism would be present regardless of the existence of optical anisotropy. However, a contrast ratio of only 4:1 is observed for the unpolarized normalized transmission $(T_c+T_u)/(T_c+T_u)_o$ shown in FIG. 6. It is the anisotropic bleaching of the anisotropic probe absorption that produces the ultrafast polarization rotation responsible for the enhancement of the contrast ratio in the modulator of the present invention. The 12° dynamic rotation away from the c-axis combined with the laser-measured static rotation of ~12° toward the c-axis at the operating wavelength of the device indicates that the optical anisotropy of the modulator is nearly removed by the pump-created excitations at $\tau=0^+$. As the carriers leave the states optically coupled by the probe, the anisotropic bleaching and concomitant dynamic polarization rotation are reduced, as evidenced by the decay in the normalized transmission through the crossed polarizer. Pump intensity dependent measurements of the normalized transmission decay curves indicate that the decay time becomes longer with decreasing carrier density. This behavior suggests that nonlinear recombination mechanisms rather than saturation effects associated with trapping into localized states govern the carrier dynamics for the densities employed in our measurements.

FIG. 1 shows an embodiment of the invention in which a continuous wave (CW) light source is the modulated beam. As described above, for normal incident light linearly polarized at 45 degrees with respect to the c-axis, the polarization component of the light parallel to the c-axis is absorbed less strongly than the perpendicular component. This absorption anisotropy leads to a polarization rotation toward the c-axis. After suitable phase compensation for the static birefringence in the growth substrate, a polarizer after the device is oriented for minimum transmission. When an ultrashort light pulse resonantly excites electron-hole pairs, anisotropic bleaching causes an ultrafast polarization rotation associated with the removal of the optical anisotropy inherent in the structure. The polarization rotation enables light to pass through the crossed polarizer. Thus, because the off-state is completely dark due to the crossed polarizer, the contrast in the on-state, aided by polarization rotation and bleaching of the absorption, is very high. The decay time of the modulation is governed by the carrier dynamics described above. Individual modulation pulses impressed upon this CW light source may be detected using high speed optoelectronic means.

In conclusion, the present invention demonstrates an optically addressed normal incidence ultraviolet light modulator which achieves high contrast by exploiting optical anisotropy, preferably optical anisotropy in a bulk crystal or semiconductor having a bandgap in the ultraviolet range grown on a substrate surface of low rotation symmetry such as is found in a thin film of ZnO epitaxially grown on R-plane sapphire. An ultrafast dynamic polarization rotation of ~12° created by aniostropic bleaching of the anisotropic absorption is employed in attaining a contrast ratio of 70:1. The temporal response of the modulation is characterized by a pulse width-limited rise time, and a decay to a quasi-equilibrium value within 100 ps.

Having thus shown and described what are at present considered to be preferred embodiments of the present invention, it should be noted that the same have been made by way of illustration and not limitation. Accordingly, all modifications, alterations and changes coming within the spirit and scope of the present invention are herein meant to be included.

We claim:

1. A high contrast, high speed ultraviolet light modulator comprising:
    a light source;
    a semiconductor having a bandgap in the ultraviolet range grown on a substrate surface of low rotation symmetry whereby the semiconductor exhibits optical anisotropy;
    a pulse generator for delivering a pulsed modulating beam for the optical control of the optical anisotropy whereby the light source is modulated.

2. A high contrast, high speed ultraviolet light modulator according to claim 1 whereby the low rotation symmetry surface is R-plane sapphire.

3. A high contrast, high speed ultraviolet light modulator according to claim 2 whereby the semiconductor comprises a single crystal ZnO film epitaxially grown on the R-plane sapphire substrate.

4. A high contrast, high speed ultraviolet light modulator according to claim 1 wherein the light source is pulsed.

5. A high contrast, high speed ultraviolet light modulator according to claim 1 wherein the light source is CW.

6. A high contrast high speed modulator according to claim 1 further comprising means for applying an electric field across the surface of the modulator to sweep out excess photogenerated carriers.

7. A high contrast, high speed ultraviolet light modulator according to claim 1 further comprising a phase compensator for compensating for the static birefringence of the substrate;

a polarizer for analysis of the modulated light source, and a high speed optoelectronic detection system.

8. A high contrast, high speed ultraviolet light modulator comprising:

a light source;

a bulk crystal having a bandgap in the ultraviolet range cut such that the surface of the crystal is one of low rotation symmetry whereby the crystal exhibits optical anisotropy;

a pulse generator for delivering a pulsed modulating beam for the optical control of an optical anisotropy in the bulk crystal whereby the light source is modulated.

9. A high contrast, high speed ultraviolet light modulator according to claim 8 whereby the bulk crystal comprises ZnO.

10. A high contrast, high speed ultraviolet light modulator according to claim 8 wherein the light source is pulsed.

11. A high contrast, high speed ultraviolet light modulator according to claim 8 wherein the light source is CW.

12. A high contrast high speed modulator according to claim 8 further comprising means for applying an electric field across the surface of the modulator to sweep out excess photogenerated carriers.

* * * * *